US008034172B2

(12) United States Patent
Naidoo et al.

(10) Patent No.: US 8,034,172 B2
(45) Date of Patent: Oct. 11, 2011

(54) ASPHALT COMPOSITIONS AND PRODUCTS COMPRISING TALL OIL DERIVED MATERIALS, AND METHODS FOR MAKING AND USING SAME

(75) Inventors: Prenathan Naidoo, Diamondhead, MS (US); William E Sonnier, Seabrook, TX (US); Rick A. Billings, Magnolia, TX (US)

(73) Assignee: Foris Technologies, L.L.C., Houston, TX (US)

( * ) Notice: Subject to any disclaimer, the term of this patent is extended or adjusted under 35 U.S.C. 154(b) by 245 days.

(21) Appl. No.: 12/337,483

(22) Filed: Dec. 17, 2008

(65) Prior Publication Data

US 2010/0147190 A1  Jun. 17, 2010

(51) Int. Cl.
*C08L 95/00* (2006.01)
*C08L 91/00* (2006.01)

(52) U.S. Cl. .......... 106/273.1; 106/278; 106/281.1; 106/243; 106/269; 524/59

(58) Field of Classification Search ............... 106/273.1, 106/277, 278, 280, 281.1, 123.11, 123.13, 106/219, 230, 231, 232, 234, 235, 241, 243, 106/268, 270, 271; 524/59, 60, 62, 68, 69, 524/70, 71, 77, 78; 523/402, 450, 455; 208/44
See application file for complete search history.

(56) References Cited

U.S. PATENT DOCUMENTS

| | | | | |
|---|---|---|---|---|
| 3,556,827 A * | 1/1971 | McConnaughay | | 106/280 |
| 3,867,162 A * | 2/1975 | Elste, Jr. | | 106/277 |
| 4,337,193 A * | 6/1982 | Szita | | 106/241 |
| 4,362,568 A * | 12/1982 | Ostermeyer | | 106/277 |
| 4,373,960 A * | 2/1983 | Ward, Jr. | | 106/241 |
| 4,433,084 A * | 2/1984 | Ostermeyer et al. | | 524/62 |
| 4,437,896 A * | 3/1984 | Partanen | | 106/277 |
| 4,479,827 A * | 10/1984 | Ward | | 106/273.1 |
| 5,221,703 A * | 6/1993 | Ostermeyer | | 524/68 |
| 2010/0147190 A1* | 6/2010 | Naidoo et al. | | 524/69 |
| 2010/0170417 A1* | 7/2010 | Naidoo et al. | | 106/278 |
| 2010/0227954 A1* | 9/2010 | Naidoo et al. | | 524/68 |

* cited by examiner

*Primary Examiner* — Helene Klemanski
(74) *Attorney, Agent, or Firm* — J.M. Gilbreth; Gilbreth Roebuck P.C.

(57) ABSTRACT

Asphalt compositions and products in which the binder comprises tall oil materials possibly previously subjected to distillation, and/or oxidation, and/or combined with a polymer, the tall oil materials having a softening point in the range of 75 F to 400 F, a Needle Penetration value (0.1 mm) at 25 C of at least 1, a Rotational Viscosity at 275 F in the range of 650 cps to 8,000 cps, and a water solubility of less than 10 percent.

40 Claims, No Drawings

ASPHALT COMPOSITIONS AND PRODUCTS COMPRISING TALL OIL DERIVED MATERIALS, AND METHODS FOR MAKING AND USING SAME

BACKGROUND OF THE INVENTION

1. Field of the Invention

The present invention relates to asphalt compositions and products, and to methods of making and using such compositions and products. In another aspect, the present invention relates to asphalt compositions and products comprising renewable materials, and to methods of making and using such compositions and products. In even another aspect, the present invention relates to asphalt compositions and products comprising tall oil based materials, and to methods of making and using such compositions and products. In still another aspect, the present invention relates to asphalt compositions and products comprising modified tall oil based materials, and to methods of making and using such compositions and products. In yet another aspect, the present invention relates to asphalt compositions and products comprising oxidized or distilled tall oil based materials, and to methods of making and using such compositions and products. In even still another aspect, the present invention relates to asphalt compositions and products comprising tall oil based materials and polymers, and to methods of making and using such compositions and products as a partial or whole substitute for asphalt/bitumen with or without polymer modification.

2. Brief Description of the Related Art

Asphalt is a sticky, black and highly viscous liquid or semi-solid that is present in most crude petroleum and in some natural deposits. In U.S. terminology, asphalt (or asphalt cement) is the carefully refined residue from the distillation process of selected crude oils. Outside North America, the product is called bitumen.

Asphalt binder is a key ingredient in pavements, roofing and waterproofing applications. The primary use of asphalt is in road construction, where it is used as the glue or binder for the aggregate particles, and accounts for approximately 80% of the asphalt consumed in the United States. The most common type of flexible pavement surfacing in the United States is hot mix asphalt (HMA) that may also be known by many different names such as hot mix, asphalt concrete (AC or ACP), asphalt, blacktop or bitumen.

After use of asphalt in road construction, roofing applications, mainly in the form of roofing shingles account for most of the remaining asphalt consumption. Other uses include waterproofing applications.

Concerns over peak oil, pollution, climate change, urban heat islands, oil price fluctuations, and/or changes in refinery operations, have provided incentive to consider non-petroleum alternatives.

As an example, asphalt prices are escalating sharply due to supply/demand of crude oil and also because more refineries are installing cokers to convert asphalt and asphalt like residues into transportation fuels to meet growing demand. This means that asphalt binder will continue to become limited in supply and will become progressively more expensive.

As another example, emissions from asphalt binders derived from petroleum sources are of concern due to their composition of sulfur compounds, poly-nuclear aromatics and Nitrogen compounds. This poses a health hazard for employees in the aggregate mixing and paving operations as well as to the motoring public during paving operations.

Bioasphalt is an asphalt alternative made from non-petroleum based renewable sources.

These renewable sources include sugar, molasses and rice, corn and potato starches, natural tree and gum resins, natural latex rubber and vegetable oils, lignin, cellulose, palm oil waste, coconut waste, peanut oil waste, canola oil waste, potato starch, dried sewerage effluent and so on. Bitumen can also be made from waste vacuum tower bottoms produced in the process of cleaning used motor oils, which are normally burned or dumped into land fills. Non-petroleum based bitumen binders can be colored, which can reduce the temperatures of road surfaces and reduce the urban heat islands.

The use of tall oil in asphalt compositions and products has been known for a long time as shown in the following patents.

U.S. Pat. No. 3,867,162 to Elste, Jr., issued Feb. 18, 1975, discloses bituminous emulsions that develop good adhesion with either calcium-based aggregates or siliceous-based aggregates or mixtures thereof. The base emulsions useful in this invention are comprised of (1) bitumen, (2) a cationic emulsifier, (3) acid, and (4) water. To this base emulsion is added (1) an adhesion promoter such as tall oil, and (2) a hydrocarbon solvent to form the finished modified emulsions.

U.S. Pat. No. 4,373,960 to Ward, Jr., issued Feb. 15, 1983, discloses an asphalt binder composition useful with mineral aggregate particles to form a patching composition for the repair of roads. The asphalt binder composition comprises: (1) a medium curing liquid asphalt, (2) from about 0.1 to 13.5% by weight tall oil based on the weight of the medium curing liquid asphalt, and (3) 0.0001% to 0.05% by volume of organopolysiloxane fluid, based on the volume of medium curing liquid asphalt plus tall oil. A patching composition is also provided which comprises from about 3 to 8% of asphalt binder composition, defined above, and from about 97 to 92% by weight of a mineral aggregate, based on the weight of asphalt binder composition plus mineral aggregate. A coating or sealing composition comprises: (1) a rapid curing liquid asphalt and (2) from about 0.1 to 13.5% by weight tall oil, preferably 1% by weight tall oil, based on the weight of rapid curing liquid asphalt. Methods are provided for preparing the compositions and for repairing roadways.

U.S. Pat. No. 4,479,827 to Ward, issued Oct. 30, 1984, discloses an asphalt binder composition useful with aggregate particles. The asphalt binding composition comprises: (1) a medium curing liquid asphalt, and (2) from about 0.1 to 13.5% by weight tall oil based on the weight of the medium curing liquid asphalt. An aggregate containing asphalt composition is also provided which comprises the asphalt binder composition, defined above, and aggregate.

U.S. Pat. No. 5,221,703 to Ostermeyer, issued Jun. 22, 1993, discloses modified asphalt cements that comprise asphalt cement, reacted tall oil, tall oil pitch, tall oil derivatives or mixtures of these, and polymers selected from block copolymers and latexes, both synthetic and natural. Methods of manufacturing include: blending a reacted tall oil-modified asphalt cement with a polymer-modified asphalt cement to obtain the desired properties; modifying an asphalt cement with a reacted tall oil, tall oil pitch, tall oil derivatives or mixture thereof, and then adding the selected polymer(s) to this tall oil-modified asphalt cement; modifying the asphalt cement with the selected polymer(s) and then adding the tall oil, tall oil pitch, tall oil derivatives and mixtures thereof and reacting with a strong base; and, adding the polymer(s), tall oil, tall oil pitch, tall oil derivatives and mixture thereof and the strong base all to the asphalt cement at or nearly at the same time.

U.S. Pat. No. 6,149,351 to Doyle, issued Nov. 21, 2000, discloses methods for preparation of chemically-stabilized emulsions of tall oil in water. Temperature and pH are controlled during preparation of the emulsions so as to prevent saponification and neutralization of acids in the tall oil component. The final emulsions have pHs in the range of from about 3.0 to 5.0 and remain phase stable for extended periods of time. Methods are disclosed for using the emulsions for soil treatment to improve soil stabilization and load bearing capacity for roadbed use, for treatment of reclaimed asphalt pavement for reuse as a stabilized base course for roadway construction and for remediation of heavy metal contaminated soil.

U.S. Pat. No. 6,346,561, to Osborn, issued Feb. 12, 2002, discloses a recipe and method for combining Gilsonite and other asphaltites with curative elastomers that are powder granular form and which are added to asphalt. Second recipe and method is disclosed to create a dry liquid concentrate comprised of cured elastomers in combination with tall oil or other fatty acids and may also include Gilsonite to be added to asphalt.

U.S. Pat. No. 6,774,165 to Clark, et al., issued Aug. 10, 2004, discloses a method of preparing an amine-free emulsion of alkaline earth metal sulfonates is disclosed. A solution of water and a nonionic, associative thickener of the type normally used for viscosity and thixotropy modification of latex compounds is combined with an overbased or neutral earth metal sulfonate or sulfonate complex to produce the emulsion. Mixtures of these emulsified products with other ingredients such as neutral diluent oils, linear alcohol/hydrocarbon mixtures, tall oil fatty acids, non-ionic surfactants, oxidized polyethylene waxes, small levels of microcrystalline wax, petrolatums, and/or calcium salts of oxidized petrolatums is also disclosed. The resulting emulsions find application in the modification of asphalt emulsions, the formulation of temporary coatings for the protection of painted automotive surfaces (transit coatings for automobiles) and in the prevention of corrosion of metal surfaces.

All of the patents, publications, articles and/or materials cited in this specification, are herein incorporated by reference.

However, in spite of the above advancements, there still exists a need in the art for asphalt compositions and products, and to methods of making and using such compositions and products.

There exists another need in the art for asphalt compositions and products comprising renewable materials, and to methods of making and using such compositions and products.

There exists even another need in the art for provide asphalt compositions and products comprising tall oil based materials, and to methods of making and using such compositions and products.

There exists still another need in the art for asphalt compositions and products comprising modified tall oil based materials, and to methods of making and using such compositions and products.

There exists yet another need in the art for asphalt compositions and products comprising oxidized or distilled tall oil based materials, and to methods of making and using such compositions and products.

There exists even still another need in the art for asphalt compositions and products comprising tall oil based materials and polymers, and to methods of making and using such compositions and products, as a partial or whole substitute for petroleum asphalt/bitumen with or without polymer modification.

These and other needs in the art will become apparent to those of skill in the art upon review of this specification, including its drawings and claims.

SUMMARY OF THE INVENTION

It is an object of the present invention to provide asphalt compositions and products, and to methods of making and using such compositions and products.

It is another object of the present invention to provide asphalt compositions and products comprising renewable materials, and to methods of making and using such compositions and products.

It is even another object of the present invention to provide asphalt compositions and products comprising tall oil based materials, and to methods of making and using such compositions and products.

It is still another object of the present invention to provide asphalt compositions and products comprising modified tall oil based materials, and to methods of making and using such compositions and products.

It is yet another object of the present invention to provide asphalt compositions and products comprising oxidized or distilled tall oil based materials, and to methods of making and using such compositions and products.

It is even still another object of the present invention to provide asphalt compositions and products comprising tall oil based materials and polymers, and to methods of making and using such compositions and products, as a partial or whole substitute for petroleum asphalt/bitumen with or without polymer modification.

This and other objects of the present invention will become apparent to those of skill in the art upon review of this specification, including its drawings and claims.

According to one non-limiting embodiment of the present invention, there is provided an asphalt product. The product includes a a tall oil material having a softening point in the range of 75 F to 400 F, a Needle Penetration value (0.1 mm) at 25 C of at least 1, a Rotational Viscosity at 275 F in the range of 650 cps to 8,000 cps, and a water solubility of less than 10 percent. The product also includes a petroleum based asphalt, wherein the weight ratio of asphalt to tall oil material is in the range of about 1:99 to about 99:1.

According to another non-limiting embodiment of the present invention, there is provided a product comprising aggregate and a binder. The binder may include a tall oil material having a softening point in the range of 75 F to 400 F, a Needle Penetration value (0.1 mm) at 25 C of at least 1, a Rotational Viscosity at 275 F in the range of 650 cps to 8,000 cps, and a water solubility of less than 10 percent. The binder may also include a petroleum based asphalt. When both are present, the weight ratio of asphalt to tall oil material is in the range of about 1:99 to about 99:1. The aggregate is dispersed throughout the binder.

According to even another non-limiting embodiment of the present invention, there is provided a method of modifying a petroleum based asphalt. The method may include contacting the petroleum based asphalt with at least one modifier comprising a tall oil material to form a modified asphalt, wherein the tall oil component has a softening point in the range of 75 F to 400 F, a Needle Penetration value (0.1 mm) at 25 C of at least 1, a Rotational Viscosity at 275 F in the range of 650 cps to 8,000 cps, and a water solubility of less than 10 percent, and wherein the weight ratio of petroleum based asphalt and tall oil material is in the range of about 1:99 to about 99:1.

According to still another non-limiting embodiment of the present invention, there is provided a method of making an asphalt product. The method may include forming a mixture comprising aggregate, a petroleum based asphalt and a tall oil material, to form an asphalt product, wherein the tall oil material has a softening point in the range of 75 F to 400 F, a Needle Penetration value (0.1 mm) at 25 C of at least 1, a Rotational Viscosity at 275 F in the range of 650 cps to 8,000 cps, and a water solubility of less than 10 percent, and wherein the weight ratio of petroleum based asphalt and tall oil material is in the range of about 1:99 to about 99:1.

According to yet another non-limiting embodiment of the present invention, there is provided a tall oil asphalt product. The product may include a tall oil material and at least one polymer. The polymer may include at least one selected from the group consisting of Latex Emulsion, Styrene Butadiene Styrene, natural or synthetic Styrene Butadiene Rubber, Styrene Ethylene Butadiene Styrene, Polypropylene (polymer or wax), Polyethylene (polymer or wax), Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, PTFE. The weight ratio of tall oil material to polymer may be in the range of about 1:99 to about 99:1. The product may be free of petroleum based asphalt. The product has a softening point in the range of 75 F to 400 F, a Needle Penetration value (0.1 mm) at 25 C of at least 1, a Rotational Viscosity at 275 F in the range of 650 cps to 8,000 cps, and a water solubility of less than 10 percent.

According to even still another non-limiting embodiment of the present invention, there is provided a product. The product may include aggregate and a binder. The binder may include a tall oil material having a softening point in the range of 75 F to 400 F, a Needle Penetration value (0.1 mm) at 25 C of at least 1, a Rotational Viscosity at 275 F in the range of 650 cps to 8,000 cps, and a water solubility of less than 10 percent. The aggregate may be dispersed throughout the binder, and the product may be free of petroleum based asphalt.

DETAILED DESCRIPTION OF THE INVENTION

The present invention utilizes tall oil materials in asphalt compositions and products. Some embodiments of the present invention utilize tall oil materials having an increased softening point. In some embodiments, part or all of the tall oil materials are oxidized to increase the softening point, while keeping viscosity as low as possible. In other embodiments, part or all of the tall oil materials are distilled to increase the softening point, generally by removing the lighter fractions. In even other embodiments, part or all of the tall oil materials may be both oxidized and distilled, in either order. In still other embodiments, various parts of the tall oil materials may be oxidized and/or distilled. As non-limiting examples, one part oxidized and one part distilled, or one part oxidized and one part both oxidized and distilled, or one part distilled and one part both oxidized and distilled, or even one part oxidized one part distilled and one part both oxidized and distilled. In still other embodiments, the tall oil materials (oxidized, distilled, or not) are combined with a polymer to increase the softening point. In the practice of the present invention, tall oil materials, especially oxidized tall oil, may be used as an additive to partially or fully replace petroleum based asphalt binders.

It is believed that any known asphalt composition or product may be made using the tall oil materials of the present invention to replace part or all of the petroleum based asphalt binder therein. The known equipment and methods of making the known asphalt compositions and products are believed to be sufficient for making the asphalt compositions and products of the present invention in which part or all of the petroleum based asphalt has been partially or wholly replaced by the tall oil materials of the present invention.

As used herein, including the claims, "tall oil materials" includes man made and naturally occurring tall oil, tall oil pitch, tall oil blends, and similar tall oil products. Tall oil is a liquid resinous material that may be obtained in the digestion of wood pulp from paper manufacture. Commercial tall oils comprise a complex of fatty acids, resin acids, sterols, higher alcohols, waxes and hydrocarbons. The acid components also may be present as the esters thereof.

A common source of tall oil that may be used in the practice of the present invention is from pine trees. Besides cellulose, tall oil contains fatty acids, esters, rosin acids, sterols, terpenes, carbohydrates and lignin. These may be separated when wood is converted to paper pulp by the sulfide or Kraft process. The acids may then be neutralized in an alkaline digestion liquor. The mixture of rosin and fatty acid soap may be recovered by subsequent acidification which releases free rosin and fatty acids, the major constituents of tall oil.

In certain embodiments of the present invention, it is desired to utilize a tall oil material in which part, parts or all of the tall oil material has been subject to oxidation and/or distillation, which tall oil material may be utilized either on a neat basis or in combination with various polymers. The purpose of the oxidation and/or distillation of the tall oil material and the combination with a polymer is to increase the softening point, while keeping viscosity as low as possible.

The tall oil materials suitable for use in the present invention product can be produced using various tall oil streams—crude tall oil (CTO) or tall oil pitch (TOP). These two tall oil sources may first be modified, either by distillation and/or oxidation, and used either on a neat basis or in combination with various polymers. One purpose of the modification of the tall oil material and the optional combination with a polymer is to increase softening point, while keeping viscosity as low as possible, for use in asphalt applications.

In the case of tall oil that is used on a neat basis i.e., no polymer added, the tall oil is oxidized to a high level in order to achieve a softening point in the range of about 75° F. to about 400° F. The upper limit of the softening point is generally determined by viscosity issues, in that the tall oil must have suitable workability/flowability. The lower limit of the softening point is generally determined by flash point issues. Certainly, viscosity modifying agents may be utilized, but there is also a limit to how much these agents can help the workability/flowability. Generally the lower end on the range of softening points may be selected from 75° F., 85° F., 95° F., 100° F., 110° F., 125° F., 150° F., 175° F., 200° F., 225° F., 250° F. and 300° F., with a corresponding higher upper end for the range of softening points selected from 85° F., 95° F., 100° F., 110° F., 125° F., 150° F., 175° F., 200° F., 225° F., 250° F., 275° F., 300° F., 350° F., 375° F. and 400° F. Non-limiting examples of other suitable ranges include in the range of about 100° F. to about 275° F., and even in the range of about 125° F. to about 250° F.

The extent of oxidation may be determined through acid value determination (as measured in mg/g), that is, when the tall oil materials are oxidized, the acid value will decrease. The ending acid number will depend on the starting acid number, as not all crude tall oils or tall oil pitches will have the same starting acid number, so it will be necessary to observe the decrease in acid number. As a non-limiting example, for some lightly oxidized tall oil pitches, the acid number reduction will be in the range of about 5 to 20 titration units. As a non-limiting example, for some lightly oxidized crude tall oils the acid number reduction is in the range of about 5 to about 25 units. Certainly, there will be tall oil materials for which the acid number reduction may be greater or less than that described above, with the end softening point and the end viscosity being the determining factors for the extent of oxidation. The upper limit may be influenced by one or more of the end viscosity, end softening point, end needle penetration, and/or the end water solubility, depending upon which of those properties are desirable. Specifically, with increasing oxidation the viscosity increases, the softening point increases, the water solubility decreases, and the needle penetration decreases. In many embodiments, it is the viscosity that will be the more important factor in the end application, as with too much oxidation, the tall oil material will become too viscous for pumping or use in asphalt. Certainly, there may be some embodiments in which either the softening point or water solubility controls the amount of oxidation. The present invention anticipates the use of oxidized and/or distilled (in any order) crude tall oil, oxidized and/or distilled (in any order) pitch, and/or highly oxidized and/or distilled (in any order) crude tall oil, preferably, oxidized and/or distilled (in any order) pitch, and/or highly oxidized and/or distilled (in any order) crude tall oil.

As non-limiting examples, the tall oil used can be crude tall oil, distilled crude tall oil (with 1% to 30% of light ends removed via distillation) or tall oil pitch. As other non-limiting examples, this distillation process can be carried out in a wide range of equipment—a conventional rectification column, a thin film or wiped film evaporator, a falling film evaporator or even done as a batch flash. As a non-limiting example, a single stage wiped film evaporator may be utilized with run conditions in the evaporator at 165° C. at a vacuum of 200 microns. Certainly numerous other process conditions may be selected, for example, less vacuum could be used if higher run temperatures are used. The exact equipment used and feed stock will determine the actual run conditions. In some embodiments of the present invention, light ends distilled from tall oil materials via distillation are used as an asphalt diluent.

As a non-limiting embodiment of a suitable oxidation process, the tall oil material is charged to a batch reactor and is oxidized by blowing air into the reactor mass under controlled conditions of temperature and pressure. One non-limiting way to control the degree of oxidation, and thus the softening point and viscosity, is by oxidation time. The longer the oxidation time, the higher the softening point and the greater the viscosity.

Generally speaking, the rate of oxidation is increased through higher pressure, higher temperature, higher air rates and improved air dispersion through agitation, pressure and sparging. As non-limiting examples, run conditions used on a pilot plant scale to produce highly oxidized tall oil were 240° C., atmospheric pressure and an air rate of approximately 16 to 25 standard cubic feet per hour of air per kilogram of reactor charge. Oxidation time was approximately four (4) hours. The air rate used on a pilot scale was perhaps a bit high to be achieved commercially. Certainly lower air rates and lower temperatures can be used, and will result in increased reaction time, however. It is also important to note that the oxidation process is an exothermic reaction, so cooling must be provided to control reaction temperature once the process is begun. Additionally, some embodiments include a reactor equipped with a vent condenser in order to capture any tall oil that is vaporized from the reactor or entrained with the exhausting air.

Non-limiting examples of operating ranges to produce highly oxidized tall oil materials, are as follows: temperature in the range of about 200° C. to about 260° C., and operating pressure on the order of about 40 psig. Certainly, the operating pressure may be in the range of about 0 psig (atmospheric conditions) to about 150 psig psig, but oxidation at higher pressures reduces the loss of lighter end material through the reactor vent. Depending upon the equipment utilized and other process conditions, a non-limiting air rate will be on the order of about 1 to 30 scfh/kg (standard cubic feet per hour per kilogram of material).

In other certain embodiments the tall oil materials (oxidized, distilled, both or neither) can be combined with various polymers to elevate the softening point. As non-limiting embodiments, the polymers may be blended with the various tall oils at a suitable temperature, so that all components are in a dispersed in order to facilitate blending (non-limiting examples in the range of about 175° C. to 250° C.—preferably 165° C. to 200° C.). Non-limiting examples of polymers suitable for use in the present invention include Latex Emulsion, Styrene Butadiene Styrene, natural or synthetic Styrene Butadiene Rubber, Styrene Ethylene Butadiene Styrene, Polypropylene (polymer or wax), Polyethylene (polymer or wax), Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, PTFE, or any conventionally used asphalt modifier to form the binder component as may be desired for the particular end use application. As a non-limiting example, the range of polymer used in combination with the tall oil is 0.5% to 25%, preferably 5% to 10% weight percent, based on the weight of the tall oil. The level of polymer used sets the softening point of the blend. It is important that a homogeneous, stable blend is produced and this may be achieved with or without cross-linking agents. As a non-limiting example, blending time is typically 10 minutes to 24 hours under good agitation at the temperature range described above.

In certain embodiments of the present invention, it is desired to utilize a tall oil material that has a suitable water solubility for the end use application. As a non-limiting examples, one method for obtaining suitable water solubility is by selecting the desired amount of oxidation. Certainly, additives may be utilized to achieve the desired property. Generally, for those end use applications in which exposure to the elements, water and/or humidity is an issue, the water solubility is generally less than 10%. There may be end use applications in which a lower solubility may be desired, non-limiting examples of which include less than 7%, less than 5%, less than 3%, less than 2%, less than 1%, less than 0.5%, and perhaps even less than 0.25%.

In certain embodiments of the present invention, it is desired to utilize a tall oil material that has needle penetration suitable for the end use application. As a non-limiting examples, one method for obtaining suitable needle penetration is by selecting the desired amount of oxidation. Certainly, additives may be utilized to achieve the desired property. Generally, depending upon whether it is desired to have a hard rigid asphalt or a soft pliable asphalt, the needle penetration may as a non-limiting example, range from about 1 to about 400 (as measured at 25° C.), with the hard rigid asphalts on the lower side, and the soft pliable asphalts on the higher side of that range. As further non-limiting examples, for a hard rigid asphalt the needle penetration may be in the range of about 1-100, 1-50, and 1-25, and for soft pliable asphalt in the range of about 200-400, 250-375, and 250-350.

In certain embodiments of the present invention, it is desired to utilize a tall oil material that has a rotational viscosity suitable for the end use application. As a non-limiting example, one method for obtaining suitable rotational viscosity is by selecting the desired amount of oxidation. Certainly, additives may be utilized to achieve the desired property, but there is also a limit to how much these agents can help the workability/flowability. The suitable rotational viscosity is generally dependent upon the workability/flowability needed in the end use application. As one-non-limiting example, the upper limit of the rotational viscosity may be determined by cold weather cracking and/or slow down in processing speed at the end use application. As a non-limiting example, the lower limit of the rotational viscosity may be determined by the flash point. Generally the lower end on the range of rotational viscosity at 275 F may be selected from 650 cps, 700 cps, 800 cps, 900 cps, 1,000 cps and 1,100 cps, with a corresponding higher end for the range of rotational viscosity selected from 3,000 cps, 4,000 cps, 5,000 cps, 6,000 cps, 7,000 cps, 8,000 cps. Non-limiting examples of a suitable range includes in the range of about 650 cps to 8,000 cps at 135 C/275 F.

A non-limiting examples of a suitable oxidized tall oil asphalt binder may appear black in color, and may have a Softening Point as discussed about and optionally a Needle Penetration value (0.1 mm) at 25 C of 1 or higher and Rotational Viscosity at 150° F. in the range of 2,000 cps to 15,000 cps, or a Rotational Viscosity at 135 C/275 F with lower limit at 650 cps and higher limit at 8,000 cps. A specific non-limiting example of a suitable tall oil material asphalt of the present invention have a Needle Penetration at 25 C of at least 1, a Softening Point of at least 125 F, and water solubility at 60 C of less than 1%.

In certain non-limiting embodiments, the oxidized tall oil may be emulsified to form a cationic or anionic or non-ionic emulsion for use in road, roofing, waterproofing or other applications.

Various additives may be optionally utilized in the present invention. Non-limiting examples of suitable additive include viscosity control agents, lubricity agents, flowability agents, colorants, reinforcing agents, waxes, fibers, matting, fabric, surfactants, wetability agents, anti-skid agents, reflective additives, cross-linking agents, anti-strip agents, emulsifier, mineral additives, fillers, polymers, aqueous solutions, anti-foaming agents, dispersing agents, mixing agents, compatibilizers, water repellents, reflective agents, UV light stabilizers, solvent resistant agents, herbicides, insecticides, anti-mold/fungal agents, and antibacterial agents. Each of these various additives may be present in the range of about 0.1 to about 30 weight percent of the asphalt material.

"Aggregate" is a collective term for the mineral materials such as sand, gravel and crushed stone that are used with the asphalt binding medium to form compound materials. By volume, aggregate generally accounts for 92 to 96 percent of holt mix asphalts. Aggregate is also used for base and sub-base courses for both flexible and rigid pavements.

Aggregates can either be natural or manufactured. Natural aggregates are generally extracted from larger rock formations through an open excavation (quarry). Extracted rock is typically reduced to usable sizes by mechanical crushing. Manufactured aggregate is often the byproduct of other manufacturing industries.

In certain non-limiting embodiments involving paving applications, the tall oil materials of the present invention may partially or wholly replace the petroleum asphalt binder in paving applications. In another non-limiting embodiment, the tall oil materials may first be modified with any of the additives conventionally used to modify petroleum asphalts.

In another non-limiting embodiments, the tall oil materials may be used in petroleum asphalt compositions and products, comprising at least 1 weight percent based on the weight of the composition or product.

In even another non-limiting embodiment the tall oil materials of the present invention may be utilized in the following pavement applications: Warm Mix, Cold Mix; Tack Coat Emulsions; Hot Applied Tack Coat; Solvent Cut Back Cold Mix; Slurry Seals; Fog Seals; Joint Sealants; Patch Mixes; Crack Sealants; Airport Runways and Aprons; Harbor Wharf Sides or Motor Race Tracks.

In certain non-limiting embodiments involving roofing applications, the tall oil materials of the present invention may partially or wholly replace the petroleum asphalt binder in roofing applications, non-limiting examples of which include roofing shingles, roofing underlay, roofing mats and built-up-roofing (BUR and Mopping grades), mopping compound for coating onto roofing to form a waterproof protective layer, and flexible rolls of roofing material. As a non-limiting examples, the compositions and products of the present invention may be useful in warm mix, hot applied and emulsion versions of formulations for such roofing applications.

EXAMPLES

The following non-limiting examples are provided merely to illustrate the present invention and are not meant to limit the scope of the claims in any manner.

Example 1

Effect of Contribution of Oxidized Asphalt to Binder Stiffening

A lightly oxidized tall oil component is prepared by first charging approximately 3.2 kilograms of crude tall oil into a laboratory flask. The laboratory flask is equipped with a dip tube for the addition of air, an agitator and an electrically controlled heating mantle. The crude tall oil is heated to approximately 240° C. while being agitated. Once the reactor mass reaches 240° C., air is introduced, as measured using a rotameter, at a rate of approximately 75 scfh (standard cubic feet per hour, or 23.4 scfh/kg, under atmospheric pressure. The heating mantle is turned to off as the oxidation reaction generates adequate heat to maintain the reaction temperature. After approximately one hour, air addition is ceased and the material is allowed to cool to approximately 200° C. At this temperature, and with the agitator still in operation, 0.356 kilograms of a polyethylene wax (polymer) is added to the oxidized tall oil and allowed to mix for one hour. The resulting oxidized tall oil/polymer blend has a softening point of approximately 60 C and a rotational viscosity of approximately 4,000 cps at 135 C/275 F.

600 g base asphalt, Valero PG 67-22 was weighed out into a quart can. 200 g of the oxidized tall oil was pre-melted and added to the quart can containing the 600 g Valero base. The contents were placed into a heating mantle and the temperature was raised to 300 F while mixing under low shear (1500 rpm) using a Silverson Mixer. After 20 minutes of mixing, the sample was removed and cooled to room temperature and then the can was sealed and sent to Dongre Laboratory Services (AASHTO Accredited Laboratory) for full PG Testing according to Superpave PG Asphalt Binder Grade according to the following AASHTO approved test procedures:

Rotational Viscosity at 135° C. by ASTM D4402.

Dynamic Shear Rheometer (G*/Sin delta at 10 rad/sec © and Phase Angle) by AASHTO T315.

Rolling Thin Film Oven, mass loss % weight by AASHTO T240

Dynamic Shear Rheometer after RFTO by AASHTO T315

Pressure Aging Vessel Test by AASHTO PP1 at 212 F (100 C).

Dynamic Shear Rheometer after PAV by AASHTO T315

Creep Stiffness after PAV by AASHTO T313.

V67-22 is Valero Refinery Base Asphalt binder produced as such without any modification and graded PG 67-22. SBS RADIAL PLUS "Star" or Radial configuration of the SBS polmer., and was produced as follows:

792 g of a mixture of 25% oxidized tall oil and 75% base asphalt PG 67-22 was paced into a quart can and placed in a heating mantle and the temperature raised to 380 F while mixing under a Silverson Mixer at 3,000 rpm and under low shear. When the temperature reached 380 F, 8 g radial SBS (1%) in powder form was slowly added and the temperature maintained at 380 F for 60 minutes. 0.3% by weight of the laboratory batch (ie. 0.3% on 800 g=2.4 g) cross-linking (commercial Reactibond) agent was added slowly and the temperature and mixing maintained for further 30 minutes. After this time elapsed, the sample was removed from the mixer and cooled to room temperature and sent to Dongre Laboratory Services for testing.

The sample referenced "E76-22" is standard Polymer Modified Asphalt (PMA) produced by Ergon Refineries in Mississippi, USA and the meets the Superpave PG Asphalt Binder Grade.

E76-22 is polymer modified (i.e., SBS) version of asphalt that meets PG 76-22 grade.

PMA is Polymer Modified Asphalt.

TOC is Tall Oil Component.

TABLE 1

|  | TOC 25% in V67-22 | Control Valero 67-22 | 1% SBS Radial Plus 25% TOC in V67-22 | E76-22 PMA |
|---|---|---|---|---|
| Continuous PG | 79.9-23.3 |  | 81.5-22.8 |  |
| RV @ 135 C. | 1.408 | 0.515 | 1.625 |  |
| Phase Angle @ 76 C., degrees | 77.5 |  | 77.4 | 73.1 |
| G*@ 10 rad/sec, kPa | 1.47 |  | 1.75 | 1.05 |
| G*/sn delta @10 rad/sec. kPa | 1.51 | 1.206 at 67 C. | 1.79 | 1.1 |
| Phase Angle @ 82 C., degrees. | 79.3 |  | 79.4 |  |
| G*@10 rad/sec, kPa | 0.78 |  | 0.93 |  |
| G*/sin Delta @ 10 rad/sec, kPa | 0.8 |  | 0.94 |  |
| Pass/Fail Temp | 79.9 |  | 81.5 | 77.1 |
| RTFO RESIDUE |  |  |  |  |
| mass loss % | −0.113 | −0.083 | −0.267 |  |
| Phase Angle @ 76 C., degrees | 72.3 |  | 70.8 | 67.1 |
| G8@10 rad/sec, kPa | 3.47 | 3.811 at 67 C. | 4.47 | 2.22 |
| G*/sin delta @ 10 rad/sec, kPa | 3.64 |  | 4.74 | 2.41 |
| Phase Angle @ 82 C., degrees. | 74.6 |  | 73.7 |  |
| G*@10 rad/sec, kPa | 1.85 |  | 2.39 |  |
| G*/sin delta @ 10 rad/sec, kPa | 1.92 |  | 2.49 |  |
| PAV Residue @ 31 C.: |  |  |  |  |
| Phase Angle, degrees | 44.5 |  | 43.9 |  |
| G*@10 rad/sec, kPa | 2491 |  | 2667 |  |
| G*/sin delta @ 10 rad/\sec, kPa | 1747 | 2700 at 25 C. | 1848 |  |
| BBR: |  |  |  |  |
| Temp. C. | −12 | −12 | −12 |  |
| s, 60 s, Mpa | 158 | 132 | 150 | 150 |
| M-value, 60 s | 0.309 | 0.334 | 0.315 | 356 |
| Temp. C. | −18 |  | −18 |  |
| s, 60s, Mpa | 296 |  | 294 |  |
| M-value, 60 s | 0.266 |  | 0.258 |  |

Example 2

The Rutgers test is a severe test to assess the ability of a pavement mix to withstand repeated high stress levels of high traffic loads. Evaluations undertaken have demonstrated that the use of tall oil materials as an extender concept does not adversely impact on the binder stiffness modulus and affect the rutting resistance of the matrix of petroleum asphalt extended with oxidized asphalt, and in some embodiments may provide equivalent or superior performance to petroleum asphalt.

The addition of 25% oxidized Asphalt to a PG 67-22 binder is capable of increasing the binder performance grade ("PG") from 67-22 to nearly 80-22 without addition of any other modifiers.

The combination of asphalt binders plus aggregate mix was undertaken by the National Center For Asphalt Testing (NCAT) of the University of Auburn and which Laboratory is the foremost testing authority nationally for mixes.

The reference to use of 50% RAP is where the mix comprised of 50% virgin aggregates plus 50% RAP aggregates. The use of RAP is being encouraged to use up the stocks of RAP nationally and which is a safe disposal problem.

TABLE 2

Aggregate Mix Data and Volumetric Properties:

| Sieve Size | Control PG 76-22 binder plus virgin Aggregate | 25% TOP Extender in PG 67-22 Binder plus virgin aggregate | 25% TOP Extender in PG 67-22 Binder plus 50% RAP |
|---|---|---|---|
| 3/4" | 100.0 | 100.0 | 99.4 |
| 1/2" | 97.1 | 97.1 | 92.2 |
| 3/8" | 76.9 | 76.9 | 70.0 |
| #4 | 51.0 | 51.0 | 50.7 |
| #8 | 41.2 | 41.2 | 43.7 |
| #16 | 33.9 | 33.9 | 33.4 |
| #30 | 25.2 | 25.2 | 24.4 |
| #50 | 14.7 | 14.7 | 14.1 |
| #100 | 8.6 | 8.6 | 8.6 |
| #200 | 5.2 | 5.2 | 5.6 |
| AC, % | 5.3 | 5.3 | 5.1 |
| Air Voids, % | 3.5 | 3.4 | 3.5 |
| VMA | 15.4 | 15.4 | 14.7 |
| VFA | 77.0 | 78.0 | 77.0 |
| Stability | 5196.0 | 4386.0 | 5200.0 |
| Flow | 13.0 | 10.0 | 10.0 |

Example 3

Control 1 is from Example 1, and Control 2 is from Example 2.

TABLE 3

Hamburg Wheel Tracking Device Results

| Sample | Air Voids % | Compaction Temp, F. | Average Stripping Inflection Point Cycles | Average Rutting Rate, mm/hr | Average Total Rutting, mm |
|---|---|---|---|---|---|
| Control 1 | 6.0 | | 7500.0 | 3.4 | 24.9 |
| Control 2 | 6.0 | | | | |
| 50% RAP 1 | 6.6 | | 7700.0 | 0.8 | 19.4 |
| 50% RAP 2 | 6.8 | | | | |

The present disclosure is to be taken as illustrative rather than as limiting the scope or nature of the claims below.

Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. An asphalt product comprising: A tall oil material having a softening point in the range of 75° F. to 400° F., a Needle Penetration value (0.1 mm) at 25° C. of at least 1, a Rotational Viscosity at 275° F. in the range of 650 cps to 8,000 cps, and a water solubility of less than 10 percent; and, petroleum based asphalt, wherein the weight ratio of asphalt to tall oil material is in the range of about 1:99 to about 99:1 and wherein at least a portion of the tall oil material is oxidized.

2. The asphalt product of claim 1, further comprising aggregate.

3. The asphalt product of claim 1, further comprising at least one selected from the group consisting of viscosity control agents, lubricity agents, flowability agents, colorants, reinforcing agents, waxes, fibers, matting, fabric, surfactants, wetability agents, anti-skid agents, reflective additives, cross-linking agents, anti-strip agents, emulsifier, mineral additives, fillers, polymers, aqueous solutions, anti-foaming agents, dispersing agents, mixing agents, and compatibilizers.

4. The asphalt product of claim 1, wherein at least a portion of the tall oil material was subjected to both distillation and oxidation.

5. The asphalt product of claim 1, wherein the tall oil material has a softening point in the range of 100° F. to 275° F., and a water solubility of less than 2 percent.

6. The asphalt product of claim 1, wherein the tall oil material has a softening point in the range of 125° F. to 250° F., and a water solubility of less than 1 percent.

7. The asphalt product of claim 1, further comprising at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

8. The asphalt product of claim 1, further comprising at least one selected from the group consisting of viscosity control agents, lubricity agents, flowability agents, colorants, reinforcing agents, waxes, fibers, matting, fabric, surfactants, wetability agents, anti-skid agents, reflective additives, cross-linking agents, anti-strip agents, emulsifier, mineral additives, fillers, polymers, aqueous solutions, anti-foaming agents, dispersing agents, mixing agents, compatibilizers, water repellents, reflective agents, UV light stabilizers, solvent resistant agents, reflectants, herbicides, insecticides, anti-mold/fungal agents, and antibacterial agents.

9. The asphalt product of claim 1, wherein the tall oil material was subjected to at least one of distillation or oxidation, wherein the tall oil material has a softening point in the range of 100° F. to 275° F., a water solubility of less than 2 percent, and further comprises at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

10. A product comprising: Aggregate, and a binder comprising: a tall oil material having a softening point in the range of 75° F. to 400° F., a Needle Penetration value (0.1 mm) at 25° C. of at least 1, a Rotational Viscosity at 275° F. in the range of 650 cps to 8,000 cps, and a water solubility of less than 10 percent; and, petroleum based asphalt, wherein the weight ratio of asphalt to tall oil material is in the range of about 1:99 to about 99:1, wherein the aggregate is dispersed throughout the binder and wherein at least a portion of the tall oil material is oxidized.

11. The product of claim 10, wherein the product is an aggregate mixture or a paving mixture.

12. The product of claim 10, wherein at least a portion of the tall oil material was subjected to both distillation and oxidation.

13. The product of claim 10, wherein the tall oil material has a softening point in the range of 100° F. to 275° F., and a water solubility of less than 2 percent.

14. The product of claim 10, wherein the tall oil material has a softening point in the range of 125° F. to 250° F., and a water solubility of less than 1 percent.

15. The product of claim 10, wherein the binder further comprises at least one polymer selected from the group consisting of Latex Emulsion, Styrene Butadiene Styrene, natural or synthetic Styrene Butadiene Rubber, Styrene Ethylene Butadiene Styrene, Polypropylene (polymer or wax), Polypropylene polymer, Polyproylene Wax, Polyethylene polymer, Polyethylene wax, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

16. The product of claim 10, wherein the tall oil material was subjected to at least one of distillation or oxidation, wherein the tall oil material has a softening point in the range of 100° F. to 275° F., a water solubility of less than 2 percent, and wherein the binder further comprises at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

17. A method of modifying a petroleum based asphalt comprising: contacting the petroleum based asphalt with at least one modifier comprising a tall oil material to form a modified asphalt, wherein the tall oil component has a softening point in the range of 275° F. to 400° F., a Needle Penetration value (0.1 mm) at 25° C. of at least 1, a Rotational Viscosity at 275 F in the range of 650 cps to 8,000 cps, and a water solubility of less than 10 percent, and wherein the weight ratio of petroleum based asphalt and tall oil material is in the range of about 1:99 to about 99:1, and wherein at least a portion of the tall oil material is oxidized.

18. The method of claim 17, wherein at least a portion of the tall oil material was subjected to both distillation and oxidation.

19. The method of claim 17, wherein the tall oil material has a softening point in the range of 100° F. to 275° F., and a water solubility of less than 2 percent.

20. The method of claim 17, wherein the tall oil material has a softening point in the range of 125° F. to 250° F., and a water solubility of less than 1 percent.

21. The method of claim 17, wherein the at least one modifier further comprises at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

22. The method of claim 17, wherein the tall oil material was subjected to at least one of distillation or oxidation, wherein the tall oil material has a softening point in the range of 100° F. to 275° F., a water solubility of less than 2 percent, and wherein the at least one modifier further comprises at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

23. A method of making an asphalt product comprising: Forming a mixture comprising aggregate, a petroleum based asphalt and a tall oil material, to form an asphalt product, wherein the tall oil material has a softening point in the range of 75° F. to 400° F., a Needle Penetration value (0.1 lm) at 25° C. of at least 1, a Rotational Viscosity at 275° F. in the range of 650 cps to 8,000 cps, and a water solubility of less than 10 percent, and wherein the weight ratio of petroleum based asphalt and tall oil material is in the range of about 1:99 to about 99:1, and wherein at least a portion of the tall oil material is oxidized.

24. The method of claim 23, wherein at least a portion of the tall oil material was subjected to both distillation and oxidation.

25. The method of claim 23, wherein the tall oil material has a softening point in the range of 100° F. to 275° F., and a water solubility of less than 2 percent.

26. The method of claim 23, wherein the tall oil material has a softening point in the range of 125° F. to 250° F., and a water solubility of less than 1 percent.

27. The method of claim 23, wherein the mixture further comprises at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

28. The method of claim 23, wherein the tall oil material was subjected to at least one of distillation or oxidation, wherein the tall oil material has a softening point in the range of 100° F. to 275° F., a water solubility of less than 2 percent, and wherein the mixture further comprises at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, PTFE.

29. A tall oil product comprising: A tall oil material; and, at least one polymer selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE; wherein the weight ratio of tall oil material to polymer is in the range of about 1:99 to about 99:1, wherein the product is free of petroleum based asphalt; and wherein the product has a softening point in the range of 75° F. to 400° F., a Needle Penetration value (0.1 mm) at 25° C. of at least 1, a Rotational Viscosity at 275° F. in the range of 650 cps to 8,000 cps, and a water solubility of less than 10 percent, and wherein at least a portion of the tall oil material is oxidized.

30. The tall oil product of claim 29, wherein the product has a softening point in the range of 100° F. to 275° F., and a water solubility of less than 2 percent.

31. The tall oil product of claim 30, further comprising aggregate.

32. The tall oil product of claim 29, further comprising at least one selected from the group consisting of viscosity control agents, lubricity agents, flowability agents, colorants, reinforcing agents, waxes, fibers, matting, fabric, surfactants, wetability agents, anti-skid agents, reflective additives, cross-linking agents, anti-strip agents, emulsifier, mineral additives, fillers, polymers, aqueous solutions, anti-foaming agents, dispersing agents, mixing agents, and compatibilizers.

33. The tall oil product of claim 29, wherein at least a portion of the tall oil material was subjected to both distillation and oxidation.

34. The tall oil product of claim 29, wherein the product has a softening point in the range of 125° F. to 250° F., and a water solubility of less than 1 percent.

35. A product comprising: Aggregate, and a binder comprising a tall oil material having a softening point in the range of 75° F. to 400° F., a Needle Penetration value (0.1 mm) at 25° C. of at least 1, a Rotational Viscosity at 275° F. in the range of 650 cps to 8,000 cps, and a water solubility of less than 10 percent, wherein the aggregate is dispersed throughout the binder, and wherein the product is free of petroleum based asphalt, and wherein at least a portion of the tall oil material is oxidized.

36. The product of claim 35, wherein the product is an aggregate mixture or a paving mixture.

37. The product of claim 35, wherein at least a portion of the tall oil material was subjected to both distillation and oxidation.

38. The product of claim 35, wherein the tall oil material has a softening point in the range of 100° F. to 275° F., and a water solubility of less than 2 percent.

39. The product of claim 35, wherein the tall oil material has a softening point in the range of 125° F. to 250° F., and a water solubility of less than 1 percent.

40. The product of claim 35, further comprising at least one selected from the group consisting of Latex Emulsion, Styrene Butadiene Styrene, natural or synthetic Styrene Butadiene Rubber, Styrene Ethylene Butadiene Styrene, Polypropylene polymer, Polyproylene Wax, Polyethylene polymer, Polyethylene wax, Atactic-Polypropylene, Fischer-Tropsch Wax, Microcrystalline Wax, Crumbed Tire Rubber, Ethylene Vinyl Acetate, Terpolymers, Montan, Epoxy Resins, Petroleum Wax, and PTFE.

* * * * *